United States Patent [19]
Willner

[11] 3,757,608
[45] Sept. 11, 1973

[54] SOLAR AND PLANETARY GEAR SYSTEM WITH LOAD PRESSURE COMPENSATION

[75] Inventor: Horst Willner, Essen, Germany

[73] Assignee: Bayerische Berg-, Hutten- und Salzwerke Aktiengesellschaft, Munchen, Germany

[22] Filed: Nov. 22, 1971

[21] Appl. No.: 200,975

[30] Foreign Application Priority Data
Nov. 21, 1970 Germany.................. P 20 57 312.0

[52] U.S. Cl................................. 74/801, 74/411
[51] Int. Cl......................... F16h 1/28, F16h 57/00
[58] Field of Search.............................. 74/801, 411

[56] References Cited
UNITED STATES PATENTS

| | | | |
|---|---|---|---|
| 2,460,629 | 2/1949 | Fawick | 74/801 |
| 2,868,040 | 1/1959 | Chamberlin | 74/801 |
| 2,932,992 | 4/1960 | Larsh | 74/801 X |
| 3,218,889 | 11/1965 | Jarchow | 74/801 |
| 3,427,898 | 2/1969 | Mayer | 74/640 |
| 3,459,072 | 8/1969 | Shannon | 74/801 |
| 3,557,633 | 1/1971 | Frerichs | 74/411 X |
| 3,626,789 | 12/1971 | Winter et al. | 74/801 |

Primary Examiner—Arthur T. McKeon
Attorney—I. Irving Silverman, Norbert Melber et al.

[57] ABSTRACT

A solar and planetary gear system with load pressure compensation wherein the inner solar wheel is not deposited but bears down on the planetary wheels, the outer solar wheel being elastically connected with the gear housing or with the propelling or propelled part to make possible tumbler movements.

6 Claims, 5 Drawing Figures

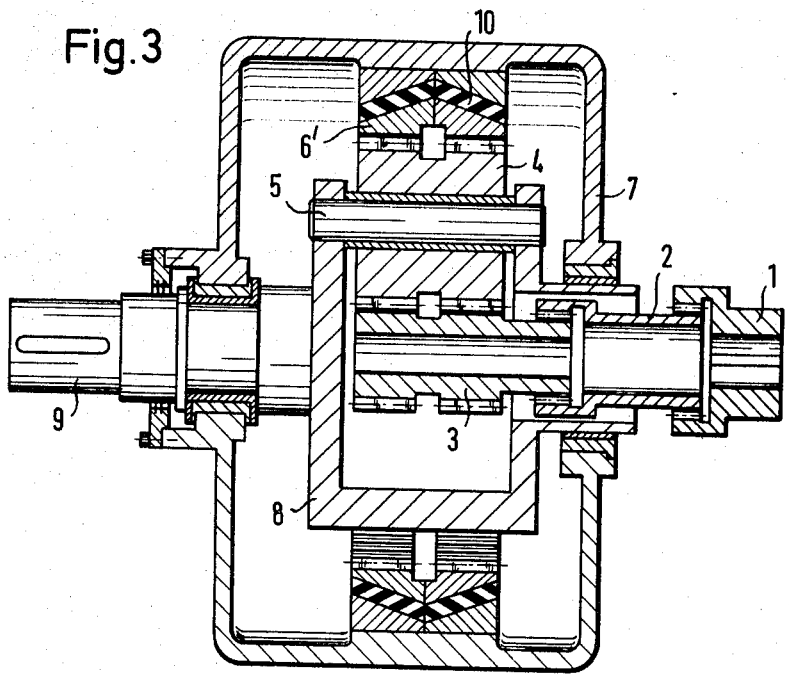
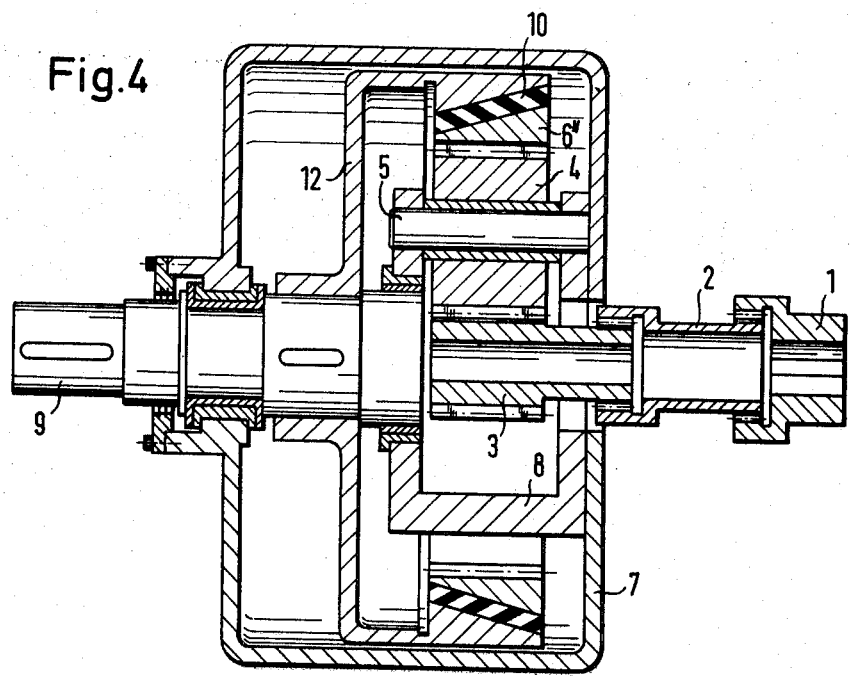

SOLAR AND PLANETARY GEAR SYSTEM WITH LOAD PRESSURE COMPENSATION

BACKGROUND OF THE INVENTION

A solar and planetary gear system is known from the prior art wherein an elastic intermediate layer is located between the internally serrated outer wheel and the gear housing in circular cylindrical jacket form. The elastic layer is firmly connected to the adjacent annular jacket surfaces over the entire circumference by vulcanization or pasting, and designed either smooth or knurled.

This design wherein the elastic intermediate layer is loaded in shear in axial and circumferential direction has the disadvantage that during vulcanization due to shrinkage of the rubber, for instance, considerable tensile stresses are created in the elastic intermediate layer which cannot be compensated. In operation, particularly under dynamic stresses, the danger, exists that the gear will fail due to damage to the elastic intermediate layer.

Furthermore, a solar and planetary gear system with continuous torque transmission is known wherein an elastic intermediate layer fills the annular area surrounding the solar wheel such that the system is break down proof. The annular area is so formed by an outer serration at the outer solar wheel and an inner serration at the part receiving the torque that both serrations partly overlap. The peculiarity of the design causes the elastic intermediate layer to be loaded only in pressure.

This design has the disadvantage that due to the load of the elastic intermediate layer in pressure, only small spring paths are possible, which make up only part of the distance between two opposite tooth flanks of the outer solar wheel and the surrounding annular area. Consequently compensation of machining and positioning errors as well as attenuation of bumps which may occur due to sudden torque fluctuations are possible only within a limited scope, as a result of the limited mobility of the outer solar wheel.

It is an object of the invention to obviate the disadvantages of the gear design described above.

SUMMARY OF THE INVENTION

A solar and planetary gear system with load pressure compensation wherein the connection between the outer solar wheel and the part which absorbs and transmits the torque is made by a cone-jacket-like elastic intermediate layer which is firmly fastened by vulcanization both to the outer annular surface of the outer solar wheel and the inner annular surface of the counterpart enveloping the solar wheel along the entire associated circumferences.

It is particularly expedient to design the gear wheels with beveled serration, that is, the gear wheels may either be simply bevel-geared or be provided with a herringbone gearing.

In the first case the planetary gear is only provided with simply bevel-geared sprocket wheels, the inner solar wheel being positioned axially.

In the second case — with the exception of the outer solar wheel — all gear wheels are provided with herringbone gears. The outer solar wheel comprises two movable simply bevel-geared individual wheels which jointly form a sprocket wheel with another herringbone gearing corresponding to the other gear wheels.

Both gear designs cause axially effective gear forces which are so directed that the volume of the elastic intermediate layer is reduced by axial shifting of the parts to be shifted against one another. Thereby, the tensile stress is further reduced or eliminated which still is present after assembling the outer solar wheel into the gear in the cone-jacket-shaped intermediate layer.

BRIEF DESCRIPTION OF THE DRAWINGS

FIG. 3 is a longitudinal section through a planetary gear with herringbone serration;

FIG. 4 is a gear with straight serration and reversal of direction of rotation between drive and power takeoff;

DESCRIPTION OF THE PREFERRED EMBODIMENTS

Figure 1:
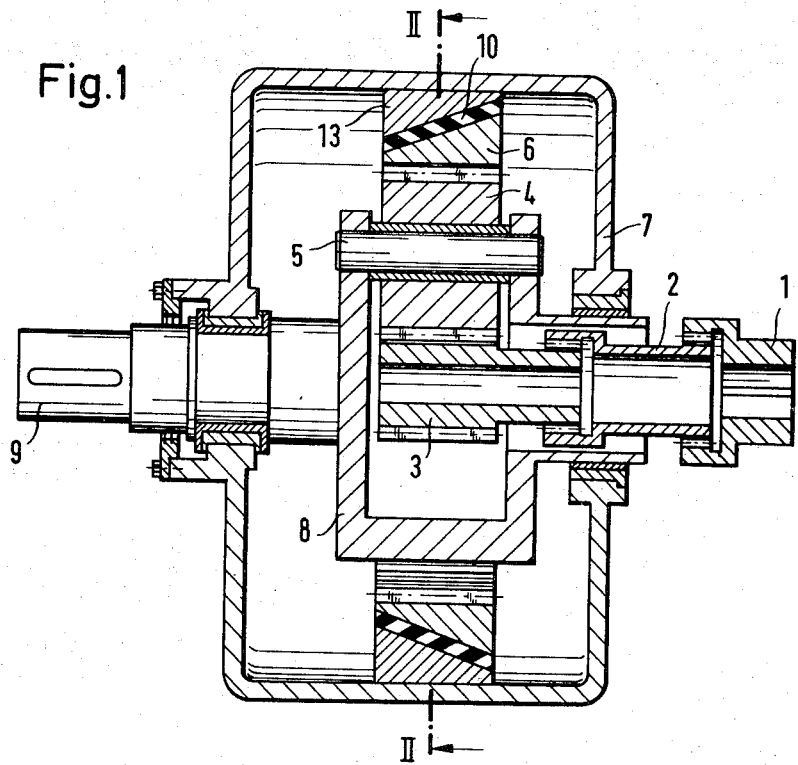
FIG. 1 is a longitudinal section through a planetary gear with straight serration.
Figure 2:
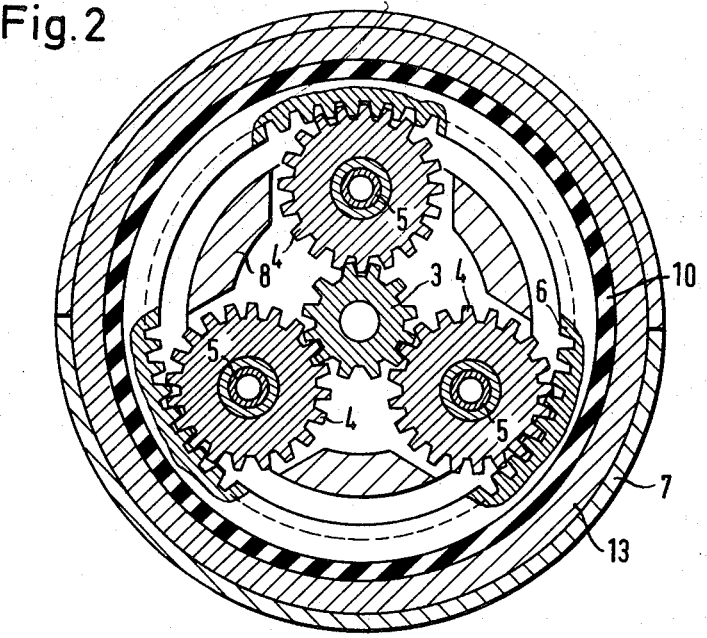
FIG. 2 is a section through the gear according to line II—II of FIG. 1.

In the gear according to FIGS. 1 and 2 a clutch flange 1 is connected on the high-speed gear side via a double gear coupling 2 to a solar wheel or sun gear 3. The latter is engaged with three planetary wheels 4 positioned rotatably on bolts 5 and supported at the internally serrated outer solar wheel or ring gear 6. The bolts are part of a planetary wheel carrier 8 positioned in a gear housing 7 and fixedly connected with a slowly rotating driving shaft 9. The outer solar wheel 6 is connected with the housing 7 via an elastic intermediate layer 10 filling out a cone-jacket like annular area, formed on the one hand by the tapered outer jacket surface of the outer solar wheel 6 and on the other hand by the opposite tapered inner jacket surface of the housing 7. The elastic intermediate layer extending over the entire width of the parts to be connected by it is firmly vulcanized onto said jacket surfaces.

The gear according to FIG. 3 differs from the one according to FIGS. 1 and 2 merely by using herringbone-serrated sprocket wheels. The outer solar wheel consists of two movable simply bevel-geared individual wheels which jointly form a herringbone sprocket wheel.

The planetary gear according to FIG. 4 is provided with a planetary carrier 8 fastened to a housing 7. A pot-shaped intermediate member 12 connected via an intermediate layer 10 filling out a jacket and cone-shaped annular area with the outer solar wheel 6'' is fastened to the driving or driven shaft 9 positioned in the housing. This gear makes possible in a manner known from the prior art a reduction of the number of revolutions with simultaneous reversal of the direction of rotation between drive and driven parts.

Figure 5:
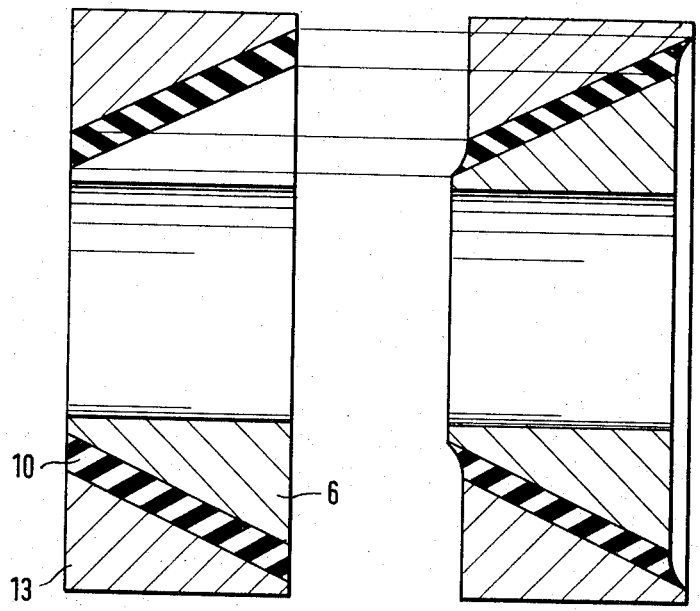
FIG. 5 is the cone-jacket joint between outer solar wheel and the counterpart enveloping the solar wheel before and after the vulcanization process.

FIG. 5 shows the shape of the joint between the outer solar wheel 6 and the counterpart enveloping same 13 before and after vulcanization. The two parts to be connected shift axially in relation to one another due to tensions occurring during vulcanization in the intermediate layer 10 so that a reduction of volume occurs in the joint. By means of frontal truing of the vulcanized blanks the alignment of both parts can be restored as shown in FIGS. 1, 3 and 4.

The gear system according to the invention has the advantage over the gear system initially described that considerable tensile stresses produced during vulcanization in the elastic intermediate layer can be reduced by axial shifting of the parts to be connected, in relation to each other, causing a reduction of the cone-jacket shaped intermediate space. This reduction of stress increases the load range within which the elastic intermediate layer remains operative. The operating safety, thus, is considerably greater in this planetary gear system than in the gear designs known heretofore from analoguous designs of the prior art.

Relative to the described other gear design, there is the advantage of greater resiliency. By appropriate dimensioning and selection of a favorable Shore hardness it is possible, due to the sheer load of the elastic intermediate layer, to obtain considerably longer spring paths than in spring elements loaded primarily in pressure. The improved mobility in axial, radial and circumferential direction makes possible a more complete load pressure compensation than one obtainable with pressure-spring elements.

Thrusts occurring in operation are considerably attenuated due to improved elasticity of the elastic intermediate layer.

What is thought to be protected by United States Letters Patent is:

I claim:

1. A solar and planetary gear system with load pressure compensation comprising a housing interposed between a driving shaft and a driven shaft, a sun gear which is supported without bearings on planetary wheels, a ring gear being elastically connected with a counterpart surrounding same to make possible tumbler movements in radial, axial and circumferential direction, the elastic connection comprising an intermediate layer of elastically deformable material, which is firmly vulcanized onto the outer face of the ring gear and the inner face of the counterpart, wherein the outer face of the ring gear is of conical configuration and the inner face of the counterpart is of a similar conical configuration whereby a hollow-cone shaped space is formed between the ring gear and the sun gear, and said intermediate layer fills said hollow-cone shaped space.

2. The solar and planetary gear system as set forth in claim 1, wherein all gear wheels are designed as bevel gears.

3. The gear system as set forth in claim 1, wherein the ring gear is elastically connected to the gear housing.

4. The gear system as set forth in claim 1 wherein the ring gear is elastically connected to the driving shaft.

5. The gear system as set forth in claim 1, wherein the ring gear is elastically connected to the driven shaft.

6. The gear system as set forth in claim 1, wherein the elastically deformable material is rubber.

* * * * *